(12) United States Patent
Dorfstatter et al.

(10) Patent No.: US 7,650,229 B2
(45) Date of Patent: Jan. 19, 2010

(54) AUTOMATIC COMMUNICATION OF SUBSCRIPTION-SPECIFIC MESSAGES TO A TELEMATICS EQUIPPED VEHICLE

(75) Inventors: Walter A. Dorfstatter, Northville, MI (US); Christopher L. Oesterling, Troy, MI (US); Michael L. Peterson, Waterford, MI (US)

(73) Assignee: General Motors LLC, Detroit, MI (US)

( * ) Notice: Subject to any disclaimer, the term of this patent is extended or adjusted under 35 U.S.C. 154(b) by 524 days.

(21) Appl. No.: 11/426,982

(22) Filed: Jun. 28, 2006

(65) Prior Publication Data

US 2008/0004788 A1    Jan. 3, 2008

(51) Int. Cl.
*G06F 19/00* (2006.01)
*G06G 7/70* (2006.01)

(52) U.S. Cl. .................. 701/117; 701/29; 701/33; 701/34; 701/36; 701/101; 701/119; 701/118; 701/200; 701/208; 455/466; 455/412.1; 455/345; 455/41.2; 455/556.1; 455/557; 455/553.1; 455/552.1

(58) Field of Classification Search ............ 701/117, 701/33, 29, 36, 208, 101, 119, 118, 200, 701/34; 455/466, 412.1, 345, 41.2, 556.1, 455/557, 553.1, 552.1, 405, 411, 420, 426.1
See application file for complete search history.

(56) References Cited

U.S. PATENT DOCUMENTS

| | | | |
|---|---|---|---|
| 6,804,602 B2 * | 10/2004 | Impson et al. .......... 701/117 |
| 7,142,959 B2 * | 11/2006 | Oesterling et al. ........... 701/29 |
| 2002/0174360 A1 * | 11/2002 | Ikeda .................... 713/200 |
| 2003/0156097 A1 * | 8/2003 | Kakihara et al. .......... 345/156 |
| 2003/0187571 A1 * | 10/2003 | Impson et al. ............ 701/117 |
| 2003/0193390 A1 * | 10/2003 | Muramatsu ........... 340/426.13 |
| 2004/0034453 A1 * | 2/2004 | Funk ........................ 701/1 |
| 2004/0054444 A1 * | 3/2004 | Abeska et al. ............... 701/1 |
| 2004/0203696 A1 * | 10/2004 | Jijina et al. ................ 455/420 |
| 2004/0239488 A1 * | 12/2004 | Douglass et al. ....... 340/426.11 |
| 2004/0259524 A1 * | 12/2004 | Watkins et al. ............. 455/405 |
| 2005/0080606 A1 * | 4/2005 | Ampunan et al. ............. 703/8 |
| 2005/0096020 A1 * | 5/2005 | Oesterling et al. ....... 455/414.2 |
| 2005/0201545 A1 * | 9/2005 | Rockett et al. ......... 379/265.01 |
| 2006/0004589 A1 * | 1/2006 | Ross et al. .................... 705/1 |
| 2006/0046649 A1 * | 3/2006 | Videtich .................. 455/12.1 |
| 2006/0085153 A1 * | 4/2006 | Oesterling et al. ........... 702/85 |
| 2006/0241817 A1 * | 10/2006 | Patenaude .................... 701/1 |
| 2006/0258379 A1 * | 11/2006 | Oesterling et al. .......... 455/466 |
| 2007/0038510 A1 * | 2/2007 | Laghrari et al. ............. 705/14 |

* cited by examiner

*Primary Examiner*—Khoi Tran
*Assistant Examiner*—Jorge O Peche
(74) *Attorney, Agent, or Firm*—Anthony Luke Simon; Reising Ethington P.C.

(57) ABSTRACT

A method of automatically communicating subscription-specific messages to a telematics-equipped vehicle includes the following steps: a) establishing a trigger and a message associated with the trigger; b) setting the trigger; c) monitoring for the occurrence of one or more conditions that satisfy the trigger; and d) determining that the one or more conditions have occurred and, if so, then; e) accessing the message associated with the trigger; and f) playing the message.

15 Claims, 2 Drawing Sheets

AUTOMATIC COMMUNICATION OF SUBSCRIPTION-SPECIFIC MESSAGES TO A TELEMATICS EQUIPPED VEHICLE

TECHNICAL FIELD

This invention relates to vehicle telematics systems and, more particularly, to communication of messages within a vehicle telematics system.

BACKGROUND OF THE INVENTION

In recent years, vehicle telematics systems have grown in popularity and are increasingly available in all types of vehicles. In general, vehicle telematics systems use a combination of various wireless voice and data telecommunications technologies to communicate between vehicles and data centers. Such communication enables a wide variety of services to be provided to subscribers of telematics services, including vehicle navigation, maintenance, diagnostics, advertising, emergency services, and messaging.

For example, pre-recorded messages can be broadcast by satellite to an entire fleet of vehicles to notify vehicle occupants of generalized information such as advertisements.

But broadcast messages are not particular to any given telematics subscription. In other words, broadcast messages are not specifically tailored to any particular subscriber, or subscriber vehicle. In another example, a human customer service representative can generate a message and transmit it to a particular telematics subscriber's vehicle by telephony. But generation and delivery of messages by a customer service representative may not always be cost effective.

SUMMARY OF THE INVENTION

According to one aspect of the present invention, there is provided a method of automatically communicating subscription-specific messages to a telematics-equipped vehicle, comprising the steps of:

(a) establishing a trigger and a message associated with the trigger;
(b) setting the trigger;
(c) monitoring for an occurrence of one or more conditions that satisfy the trigger; and
(d) determining whether the one or more conditions have occurred and, if so, then:
(e) accessing the message associated with the trigger; and
(f) playing the message.

The method may also include one or more of the following additional steps:

(g) storing the trigger and the message in a call center;
(h) loading the trigger to the vehicle;
(i) uploading data associated with the trigger from the vehicle to the call center; or
(j) downloading the message to the vehicle from the call center.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
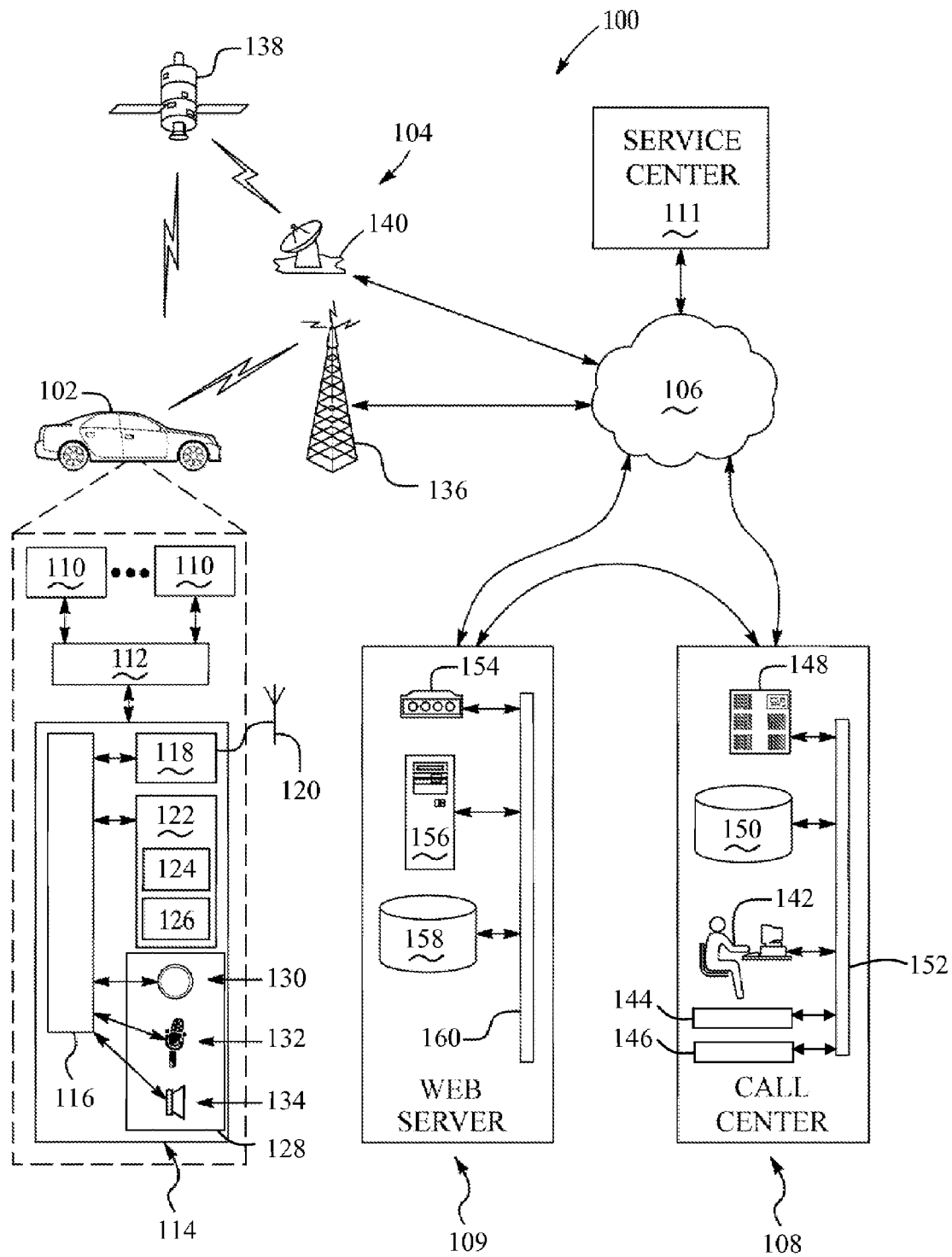
FIG. 1 is a block diagram depicting an example of a telematics system that can be used for automatic communication of subscription-specific messages to a telematics-equipped vehicle.

An exemplary operating environment is illustrated in FIG. 1, and can be used to implement the method shown in FIG. 2 and discussed below. The method can be particularly useful for automatically providing subscription-specific messages in a telematics-equipped vehicle. The method can be carried out using any suitable telematics system. Preferably, however, the method is carried out in conjunction with a vehicle telematics system such as system 100. Those skilled in the art will appreciate that the overall architecture, as well as the individual elements of the system 100 shown here, are generally known in the art.

The system 100 can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with and providing services to the vehicle 102.

The exemplary telematics system 100 generally facilitates one or more services to the occupant(s) of the vehicle 102, including vehicle navigation, turn-by-turn driving directions, telephony including automated audio interaction with vehicle occupants, emergency services, vehicle diagnostics, vehicle system updates, and automated speech recognition. For this purpose the telematics system 100 processes data and instructions as well as facilitates wireless voice and data transfer between hardware located on the vehicle 102 and hardware in the remote call center 108. For example, the telematics system 100 enables vehicle occupants to initiate voice communication, for example, with the call center 108 or the service center 111. Also, the telematics system 100 enables electronic communication between the vehicle 102 and the web server 109 for various purposes such as transmitting and/or receiving data such as updated voice messages, email, news, or the like.

Motor Vehicle

The motor vehicle 102 is depicted in the illustrated embodiment as a passenger vehicle, and it will be appreciated that any other vehicles including motorcycles, marine vehicles, aircraft, recreational vehicles, and other automobiles such as vans, trucks, etc., can be used without departing from the scope of the invention. Various electronic modules can be located on the vehicle 102 and include one or more vehicle sub-systems or vehicle system modules (VSMS) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any subsystems and/or components throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration whether wired or wireless. A few examples include a Controller Area Network (CAN), Media Oriented System Transport (MOST), Local Interconnect Network (LIN), Ethernet (10baseT, 100baseT), Local Area Network (LAN), ISO Standard 9141, ISO Standard 11898 for high-speed applications, ISO Standard 11519 for lower speed applications, SAE Standard J1850 for high-speed and lower speed applications, and/or a wireless area network.

Vehicle Telematics Unit

The vehicle telematics unit 114 facilitates communication and interactivity between the vehicle 102 or occupants thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

The communications device 118 may include any suitable technology(ies) including a satellite receiver, a cellular chipset for voice communications, a modem for data communications, etc. Also, those skilled in the art recognized that the modem can transmit and receive data over a voice channel by applying some type of encoding or modulation to convert digital data for communication through a vocoder or speech codec incorporated in a cellular chipset. Any suitable encoding or modulation technique that provides an acceptable data rate and bit error rate can be used. For a more complete discussion of an example of data transmission over a voice channel, please refer to U.S. patent application Ser. No. 11/163,579 filed Oct. 24, 2005, which is assigned to the present assignee and is hereby incorporated by reference in its entirety.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 can execute one or more control programs and processes trigger and/or message programs and/or data to carry out a method of automatically providing in-vehicle messages, either alone or in conjunction with the call center 108. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 can be used for carrying out a method of automatically providing in-vehicle messages. The database 126 can be used to store message data, diagnostic trouble code data or other diagnostic data, vehicle data upload (VDU) records, event activation tables, etc. For example, the database 126 can include voice or test messages, triggers, etc. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular, satellite, or other wireless path, and facilitates both voice and data communications. For example, the wireless telematics communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as Advanced Mobile Phone System (AMPS), code division multiple access (CDMA), time division multiple access (TDMA), Global System for Mobile communications (GSM), etc. but could also utilize proprietary or other wireless technologies to communicate with the wireless communication system 104.

The communications device 118 can also include global positioning system (GPS) communication and signal processing software and equipment, which can be separate from or integrated with the communications device 118. For example, such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

The communications device 118 can further include satellite communications signal processing software and equipment, which can be separate from or integrated with the communications device 118. The satellite communications module receives satellite radio broadcast signals from, for example, a geostationary satellite. The satellite radio module may receive broadcast radio information over one or more channels and generate an audio output or provide data communications from a satellite service provider. In addition to music and entertainment, traffic information, road construction information, advertisements, news and information on local events, satellite broadcasts may include messages. Satellite radio broadcast signals received by the satellite radio receiver can be monitored for signals with targeted information, and when the targeted information is detected, the targeted message and associated information can be extracted from the broadcast signal.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows vehicle occupants to provide voice commands or other verbal input into the telematics unit 114, as well as voice communication with various remote locations via the communications device 118. Voice commands from the vehicle occupants can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupants through audible speech, signals, or audio files, and can be stand-alone speakers specifically dedicated for use with the telematics unit 114, or they can be part of a vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), wireless local area network, broadband wireless network, or any other suitable wireless network used to transmit voice and/or data signals between the vehicle 102 and various remote locations such as the call center 108 and/or service center 111. In one embodiment, the cellular network 136 is implemented as a CDMA, GSM, or other cellular communication network that enables exchange of voice and data between the vehicle 102 and the second communication system 106.

Additionally or alternatively, wireless communication can be carried out by satellite transmission using one or more satellites 138 to connect the vehicle 102 to the second communication system 106 via a central, ground-based satellite transceiver 140.

As an exemplary implementation, the satellite transceiver 140 and satellite(s) 138 can transmit radio signals to the vehicle 102. As one example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be another wireless communication system or can be a land-based wired system such as a public switched telephone network (PTSN), Internet Protocol (IP) network, optical network, fiber network, cable network, utility power transmission lines, and/or any combination of the aforementioned examples, any of which can be used for voice and/or data communication. Those skilled in the art will recognize that the communication systems 104, 106 can be implemented separately or can be combined as an integral system.

Call Center

The call center 108 can be a data center, and can include one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals by vehicle data uploads (VDU) between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more control programs and trigger and/or message data to carry out a method of automatically providing in-vehicle messages, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables vehicle occupants to access websites and other content over the Internet, all from the vehicle using automated speech recognition technology and text-to-voice technology such as VoiceXML, or the like. For example, vehicle occupants can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupants via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that, for example, vehicle occupants can initiate a telephone call with a technician or service scheduler at the service center 111.

Method of Automatically Providing Subscription-Specific Messages

Figure 2:
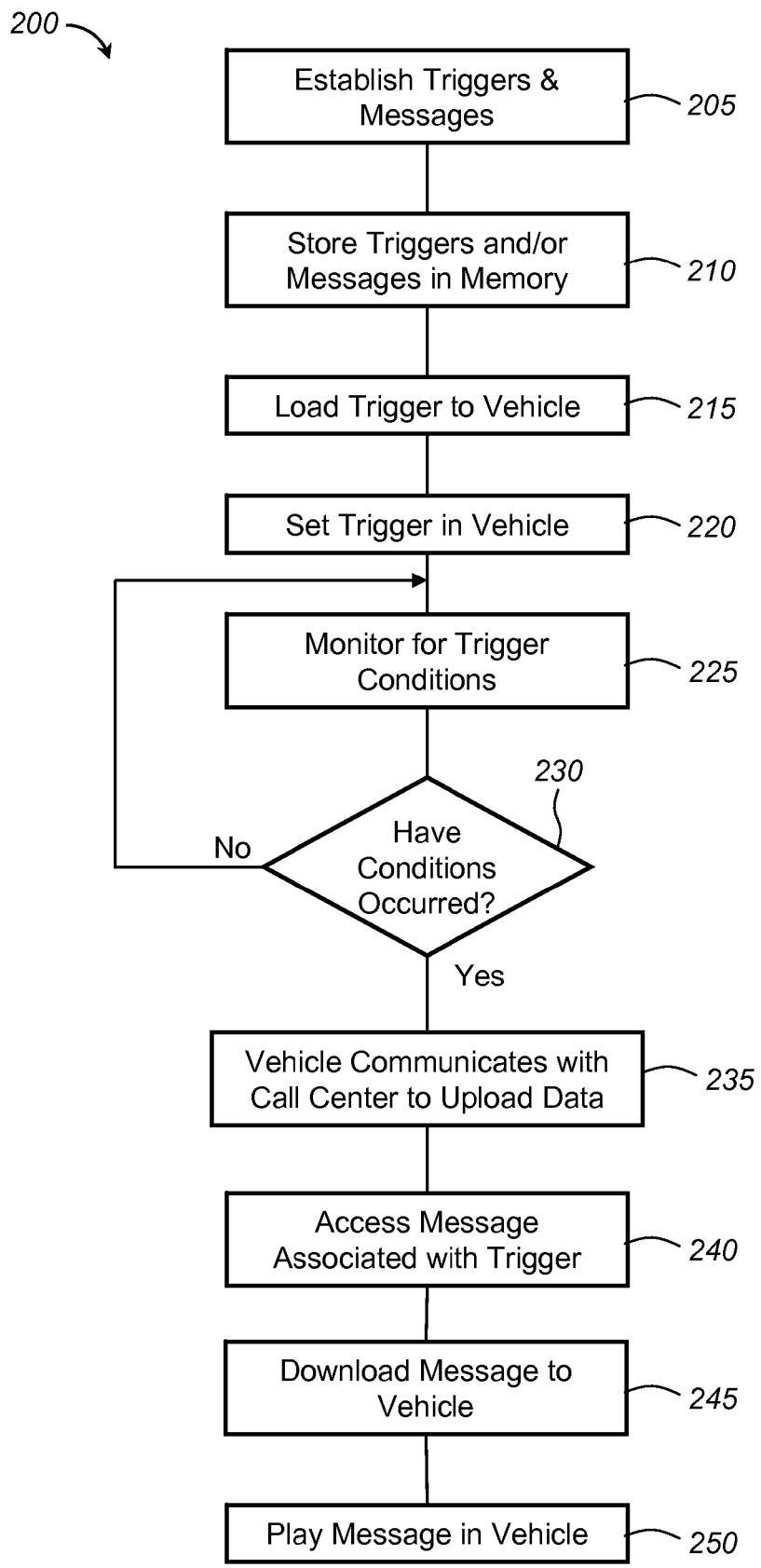
FIG. 2 is a flow chart of an embodiment of an exemplary method of automatically communicating subscription-specific messages to a telematics-equipped vehicle that can be performed using the telematics system of FIG. 1.

Referring now to FIG. 2, a method 200 of automatically communicating subscription-specific messages to a telematics-equipped vehicle is provided herein and can be carried out as one or more computer programs within the operating environment of the telematics system 100 described above. More specifically, the method 200 can be carried out using either or both of the vehicle telematics unit 114 and call center 108, and using the communications system 104, 106. Those skilled in the art will also recognize that the method can be carried out using other systems within other operating environments.

In general, the method 200 is provided to automatically communicate information in a vehicle based on an occurrence of a specific condition associated in some way with a telematics subscription for that vehicle. In other words, subscription-specific messages are automatically communicated to the vehicle in response to some relevant, monitored event. A telematics subscription can include a subscription agreement and expiration date, but can also encompasses a subscriber, the subscriber's vehicle, and/or any other subscriber-related information. Accordingly, exemplary subscription-specific conditions can include one or more of the following items: achievement of a certain vehicle mileage via an odometer reading, expiration of a time period associated with the subscription, occurrence of a timestamp, arriving to or leaving from a certain geographical location or region, reaching a certain number of engine ignition cycles, etc. Any other suitable conditions can also be used in the method 200. Accordingly, in contrast to general information that is broadcast to multitudes of vehicles for general consumption, subscription-specific messages are information relevant to a particular subscriber, the subscriber's vehicle, or any other subscriber-related information at any given moment.

In step 205, triggers and messages are established. More specifically, one or more triggers for monitoring subscription-specific conditions are established, and one or more messages associated with the one or more triggers are established. Subscription-specific conditions can be tracked using triggers that can be loaded to the vehicle, and such information can be communicated using audio and/or text messages that can also be loaded to the vehicle.

A trigger includes one or more defined conditions that, when met, enable initiation of some further action. There can be many different types of triggers; too many to list them all. But triggers can generally include vehicle mileage triggers, engine ignition cycle triggers, diagnostic trouble code triggers, global positioning triggers, and time-related triggers to name just a few. Exemplary time-related triggers can include elapsed time or mileage since last oil change triggers, telematics service subscription renewal triggers, or the like. Furthermore, each type of trigger can be parameter specific and value specific. For example, diagnostic trouble code triggers can include parameter specific triggers like anti-lock braking system fluid pressure triggers, exhaust emission level triggers, etc. In another example, vehicle mileage triggers can include value specific triggers like a 400 mile trigger, a 3,000 mile trigger, etc. Those skilled in the art will recognize that a trigger can be defined for just about any condition specific to a subscription.

After a trigger is defined conceptually, it can be manifested or generated in the form of a computer file, such as a computer program file or a portion thereof like an algorithm, pseudo code or conditional logic, or in the form of a computer data file for use by another program. Use of triggers can be facilitated by known vehicle data upload (VDU) techniques. Exemplary VDU techniques are described in U.S. patent application Publications 2004/0259524, 2004/0054444, and 2004/0203696, which are all assigned to the present assignee and hereby incorporated by reference in their entireties.

A message is a communication of information in audible, textual, or other suitable form. The message can be in a passive format wherein the message is played without active involvement from vehicle occupants. In other words, vehicle occupants do not have to affirmatively act to receive the message, such as by accessing e-mail, tuning in to a satellite broadcast, or answering a phone call or the like. One or more messages can be defined and associated with each different trigger. For example, an oil life monitor trigger can be associated with the following messages: "Your vehicle is now due for an oil change. Would you like to schedule an appointment with your dealer now?" or "This is a reminder that your vehicle is due for an oil change. Please schedule an appointment with your dealer soon" or other suitable messages. Those skilled in the art will recognize that many different types of messages can be defined for use with triggers. Once a message is defined, it can be manifested or generated in the form of a computer file stored as a voice message in acoustic data format such as a *.wav file, or a text message or text-to-voice message such as a VoiceXML file, or any other suitable format.

In step 210, the triggers and/or messages established in step 205 can be stored in computer memory in any suitable location, for example in the call center, until they are used in conjunction with the vehicle. Also, the triggers and associated messages can be made available for use on all subscriber vehicles, or some subset(s) thereof In step 215, a trigger can be loaded to a telematics-equipped vehicle. Triggers can be loaded to the vehicle at a vehicle assembly plant when the vehicle is manufactured, at a vehicle dealer, and/or from the call center. In one scenario, at least some triggers can be downloaded from the call center to the vehicle in any suitable fashion including using the communications system. The triggers can be loaded to any appropriate vehicle computing device or the like, such as the vehicle telematics unit where the trigger is stored in memory.

In step 220, a trigger can be set. The trigger can be set in any suitable location such as the call center, or the vehicle. In one example, the trigger is automatically set in the vehicle, such as when it is downloaded in step 215 from the call center to the vehicle. In another example, some triggers can be dormant in that they are already loaded to the vehicle and stored in vehicle memory but are not yet activated. Such triggers can be set by receiving an instruction from the call center.

In step 225, an occurrence of one or more conditions that satisfy a trigger can be monitored. Any of various vehicle systems, such as the VSM's, and related sensors can be used to monitor conditions covered by a set trigger. For example, a vehicle odometer can be used to provide a signal indicative of miles traveled by the vehicle. That signal can be used in monitoring vehicle mileage as it relates to a set trigger such as a 3,000 mile oil change trigger. Moreover, triggers can be set in the vehicle and all monitoring for the occurrence of a related event can take place in the vehicle. However, it will be appreciated by those skilled in the art that at least some triggers can be monitored at the call center and then a call placed to the vehicle to obtain the data associated with the trigger. In other words, the monitoring can be carried out in any suitable location by any suitable computing device that processes a trigger computer file, such as a trigger program file or other suitable program file using a trigger data file, or using any other suitable arrangement.

In step 230, it is determined whether the conditions defined by the trigger have occurred. For example, if an odometer signal is received that indicates that the vehicle has traveled over 3,000 miles, then the trigger can initiate a messaging sequence wherein a message associated with the trigger is communicated to the vehicle. In one implementation, a computer program, routine, or algorithm can be executed by a vehicle computing device such as the telematics processor and used in conjunction with signals received by suitable vehicle systems and/or sensors to determine if the one or more trigger conditions have been satisfied.

If so, then a messaging sequence is triggered. The messaging sequence can include accessing memory of a vehicle computing device to retrieve a previously stored computer file containing the associated message, and processing the computer file to communicate the message to the vehicle. The messaging sequence can also or instead include steps 235 through 245 below.

In step 235, the vehicle communicates with the call center. More specifically, the trigger can initiate a communication session between the vehicle and the call center to upload data associated with the trigger from the vehicle, in response to an affirmative determination from the determining step 230. For example, if the trigger was an oil life monitor trigger, then the trigger event data can include any suitable data indicating that the vehicle mileage has exceeded its current oil life, or that the oil life trigger threshold was met. The communication or call can be carried out using the telematics communication system. This step can be carried out using VDU protocol or any other suitable data transfer protocol(s).

In step 240, the message associated with the uploaded trigger data can be accessed from memory in the call center. This can be done, for example, using a lookup table in memory where the particular type of trigger communicated from the vehicle is used as input to look up and return a message associated with that trigger.

In step 245, the message accessed from call center memory can be downloaded to the vehicle. The message can be downloaded to the vehicle in any suitable fashion, including using any or all of the communication system. For example, the call center may use any suitable data transfer protocol such as short messaging service (SMS), GSM, CDMA, AMPS, etc. In another example, the message can be sent by satellite transmission using any suitable satellite transmission protocol. For a more complete discussion of an example of messaging using satellite transmission, please refer to U.S. Patent Publication 2006/0046649, which is assigned to the present assignee and is hereby incorporated by reference in its entirety.

Finally, in step 250, the message can be played so that it is seen and/or heard in the vehicle. For example, a computer file, such as a program or data file, containing the message can be executed or otherwise processed by any suitable vehicle processor, such as the telematics processor. Accordingly, an audio or text message can be presented to a vehicle occupant. For example, a text message can be presented on an in-vehicle display such as a computer monitor, GPS navigation screen, vehicle radio display, driver information display, or any other suitable visual output device. Also, an audio message can be presented via vehicle radio speakers, telematics speakers, or any other suitable audible output device.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of automatically communicating subscription-specific messages to a telematics-equipped vehicle, comprising the steps of:
   (a) establishing a trigger and a message associated with the trigger;
   (b) setting the trigger;
   (c) monitoring for occurrence of one or more conditions that satisfy the trigger; and
   (d) determining whether the one or more conditions have occurred and, if so, then:
   (e) accessing the message associated with the trigger; and
   (f) playing the message.

2. The method of claim 1 further comprising the step of:
   (g) storing the trigger and the message in a call center; and
   (h) downloading the trigger to the vehicle.

3. The method of claim 2 further comprising the step of:
   (i) uploading data associated with the trigger from the vehicle to the call center.

4. The method of claim 3 further comprising the step of:
   (j) downloading the message from the call center to the vehicle.

5. The method of claim 1 wherein the establishing step comprises generating one or more computer files that specify the trigger and the message.

6. The method of claim 1 wherein the setting step comprises setting the trigger in the vehicle.

7. The method of claim 1 wherein the monitoring step comprises using a vehicle telematics unit.

8. The method of claim 1 wherein the determining step comprises executing a computer program using a vehicle telematics unit with input from a vehicle system module to determine if the one or more conditions have been satisfied.

9. The method of claim 1 wherein the accessing step comprises accessing memory in a call center.

10. The method of claim 1 wherein the playing step comprises executing a computer file containing the message.

11. A method of automatically communicating subscription-specific messages to a telematics-equipped vehicle, comprising the steps of:
    (a) establishing a trigger and a message associated with the trigger;
    (b) storing the trigger and the message in a call center;
    (c) downloading the trigger to the vehicle from the call center;
    (d) setting the trigger in the vehicle;
    (e) monitoring for occurrence of one or more conditions that satisfy the trigger; and
    (f) determining whether the one or more conditions have occurred and, if so, then:
    (g) uploading data associated with the trigger from the vehicle to the call center in response to the determining step;
    (h) accessing the message associated with the trigger from memory in the call center;
    (i) downloading the message from the call center to the vehicle; and
    (j) playing the message in the vehicle.

12. The method of claim 11 wherein the establishing step comprises generating one or more computer files that specify the trigger and the message.

13. The method of claim 11 wherein the monitoring step comprises using a vehicle telematics unit.

14. The method of claim 11 wherein the determining step comprises executing a computer program using a vehicle telematics unit with input from a vehicle system module to determine if the one or more conditions have been satisfied.

15. The method of claim 1 wherein the playing step comprises executing a computer file containing the message.

* * * * *